US012640991B2

(12) United States Patent
Wang

(10) Patent No.: US 12,640,991 B2
(45) Date of Patent: May 26, 2026

(54) RESOURCE CONFIGURATION PREDICTION METHOD AND DEVICE

(71) Applicant: HUAWEI CLOUD COMPUTING TECHNOLOGIES CO., LTD., Gui'an New District (CN)

(72) Inventor: Xinhou Wang, Shenzhen (CN)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 1118 days.

(21) Appl. No.: 17/186,754

(22) Filed: Feb. 26, 2021

(65) Prior Publication Data

US 2021/0182106 A1 Jun. 17, 2021

Related U.S. Application Data

(63) Continuation of application No. PCT/CN2019/090892, filed on Jun. 12, 2019.

(30) Foreign Application Priority Data

Aug. 30, 2018 (CN) .......................... 201811004607.1

(51) Int. Cl.
*H04L 41/16* (2022.01)
*G06F 9/50* (2006.01)
(Continued)

(52) U.S. Cl.
CPC ............ *H04L 41/16* (2013.01); *G06F 9/5016* (2013.01); *G06F 9/5077* (2013.01);
(Continued)

(58) Field of Classification Search
CPC ....................... G06F 9/5077; G06F 2209/5019
See application file for complete search history.

(56) References Cited

U.S. PATENT DOCUMENTS

2016/0210534 A1* 7/2016 Padubrin .......... G06V 30/19127
2017/0318586 A1 11/2017 Wang et al.
(Continued)

FOREIGN PATENT DOCUMENTS

CN 1936849 A 3/2007
CN 103699440 A 4/2014
(Continued)

OTHER PUBLICATIONS

Jun-Bo Wang et al: "A Machine Learning Framework for Resource Allocation Assisted by Cloud Computing", IEEE Network.,vol. 32, No. 2,Dec. 16, 2017,Total 19 Pages.
(Continued)

*Primary Examiner* — Kevin L Young
*Assistant Examiner* — Carina Yun
(74) *Attorney, Agent, or Firm* — HAUPTMAN HAM, LLP

(57) ABSTRACT

This application provides a resource configuration prediction method and device applied to resource configuration prediction of a cloud service system, to improve resource allocation efficiency and reduce costs of the cloud service system. The method in embodiments of this application includes: obtaining original data of a cloud service system, where the original data includes running data of the cloud service system in a production environment or a production-like environment; obtaining training data based on the original data, and performing deep learning based on the training data to construct and obtain a resource configuration prediction model; when resource demand data input by a user is obtained, generating input data of the resource configuration prediction model based on the resource demand data; and performing prediction based on the input data and the resource configuration prediction model, to
(Continued)

obtain resource configuration data of the cloud service system.

10 Claims, 6 Drawing Sheets

(51) Int. Cl.

| | |
|---|---|
| *G06F 13/40* | (2006.01) |
| *G06F 18/214* | (2023.01) |
| *G06N 3/08* | (2023.01) |

(52) U.S. Cl.
CPC .......... *G06F 13/409* (2013.01); *G06F 18/214* (2023.01); *G06N 3/08* (2013.01); *G06F 2209/5019* (2013.01)

(56) References Cited

U.S. PATENT DOCUMENTS

| | | | | |
|---|---|---|---|---|
| 2018/0081912 | A1 | 3/2018 | Suleiman et al. | |
| 2018/0181898 | A1* | 6/2018 | Viswanath | ............. G06N 20/00 |
| 2018/0203751 | A1 | 7/2018 | Lee et al. | |
| 2018/0365229 | A1* | 12/2018 | Buhrmann | ............. G06N 5/022 |
| 2019/0095785 | A1* | 3/2019 | Sarkar | .................... G06N 20/00 |
| 2019/0166141 | A1* | 5/2019 | Xu | .......................... G06N 3/047 |
| 2019/0213099 | A1* | 7/2019 | Schmidt | ................. G06N 3/044 |
| 2019/0213504 | A1* | 7/2019 | Vasseur | ................. G06N 20/00 |

FOREIGN PATENT DOCUMENTS

| | | |
|---|---|---|
| CN | 104714845 A | 6/2015 |
| CN | 104951425 A | 9/2015 |
| CN | 107786616 A | 3/2018 |
| CN | 108446200 A | 8/2018 |
| CN | 109412829 A | 3/2019 |
| WO | 2018053717 A1 | 3/2018 |

OTHER PUBLICATIONS

Ahmed K I et al: "Deep Learning for Radio Resource Allocation in Multi-Cell Networks",arxiv.org, Cornell University Library, 201 Olin Library Cornell University Ithaca, NY,14853, Aug. 2, 2018,Total 15 Pages.
Chinese Office Action issued in corresponding Chinese Application No. 201811004607.1, dated Mar. 30, 2020, pp. 1-7.
European Search Report issued in corresponding European Application No. 19855405.7, dated Jul. 14, 2021, pp. 1-9.
International Search Report issued in corresponding International Application No. PCT/CN2019/090892, dated Aug. 22, 2019, pp. 1-11.

* cited by examiner

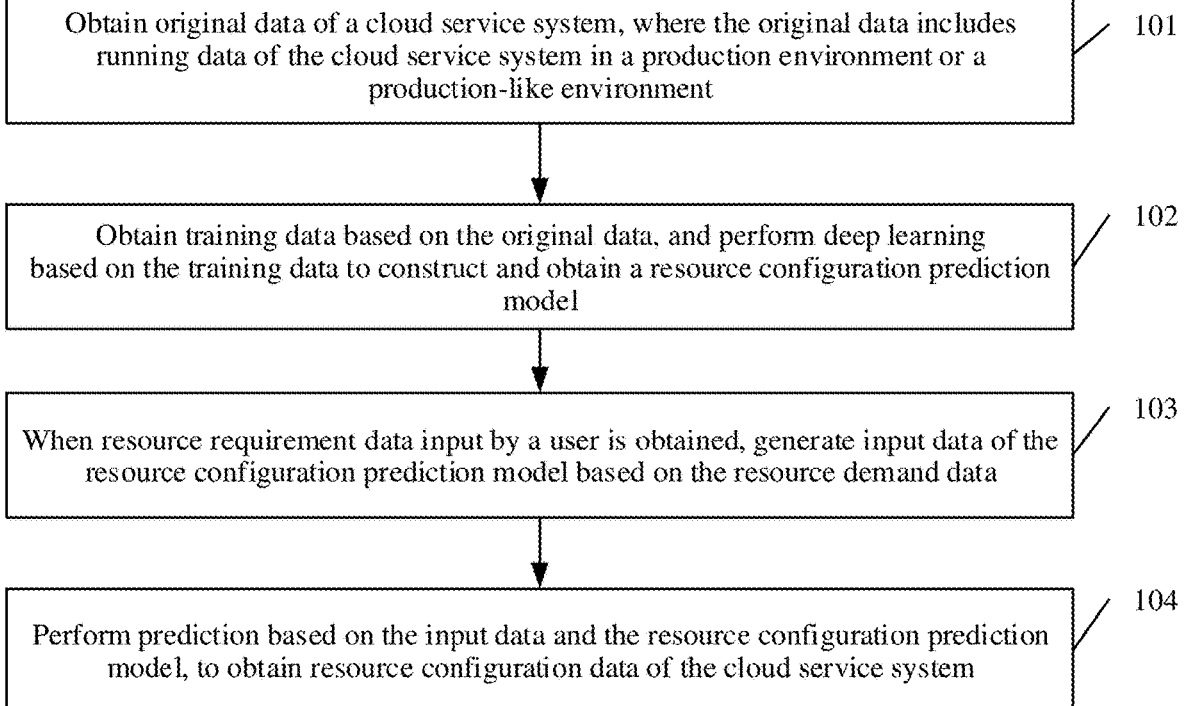

Obtain original data of a cloud service system, where the original data includes running data of the cloud service system in a production environment or a production-like environment     101

Obtain training data based on the original data, and perform deep learning based on the training data to construct and obtain a resource configuration prediction model     102

When resource requirement data input by a user is obtained, generate input data of the resource configuration prediction model based on the resource demand data     103

Perform prediction based on the input data and the resource configuration prediction model, to obtain resource configuration data of the cloud service system     104

FIG. 1

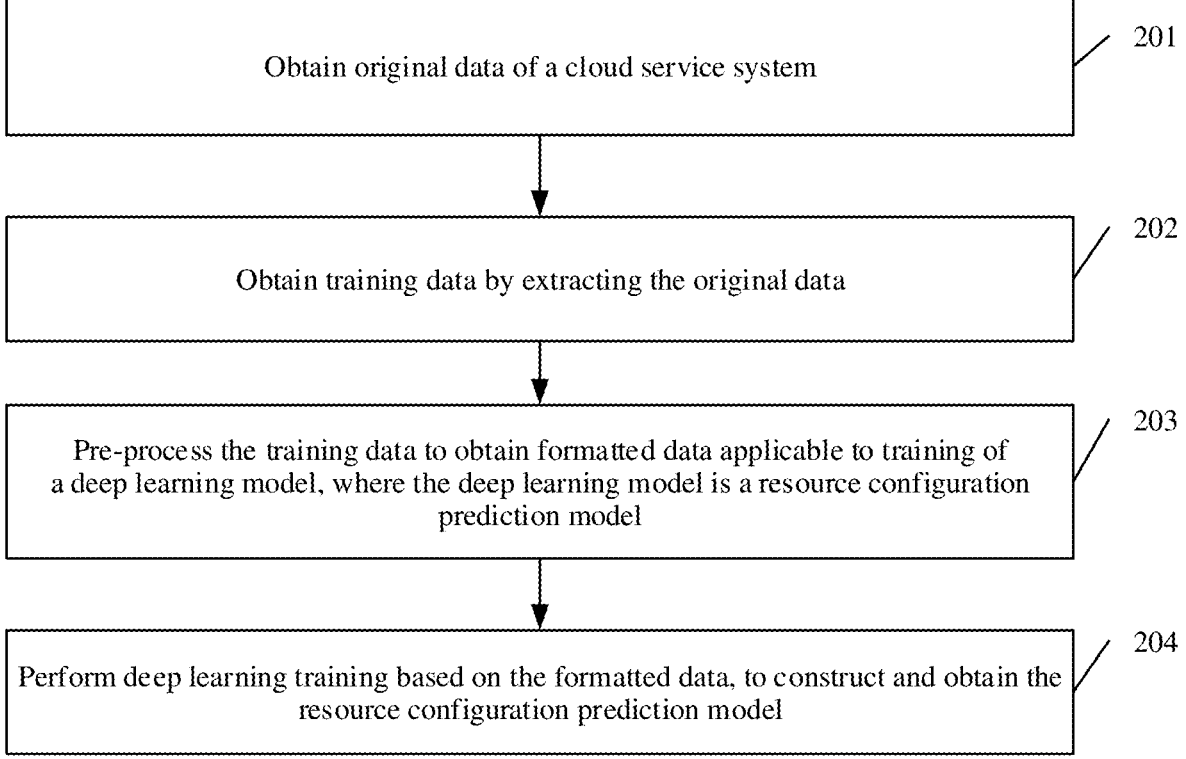

Obtain original data of a cloud service system    201

Obtain training data by extracting the original data    202

Pre-process the training data to obtain formatted data applicable to training of a deep learning model, where the deep learning model is a resource configuration prediction model    203

Perform deep learning training based on the formatted data, to construct and obtain the resource configuration prediction model    204

FIG. 2

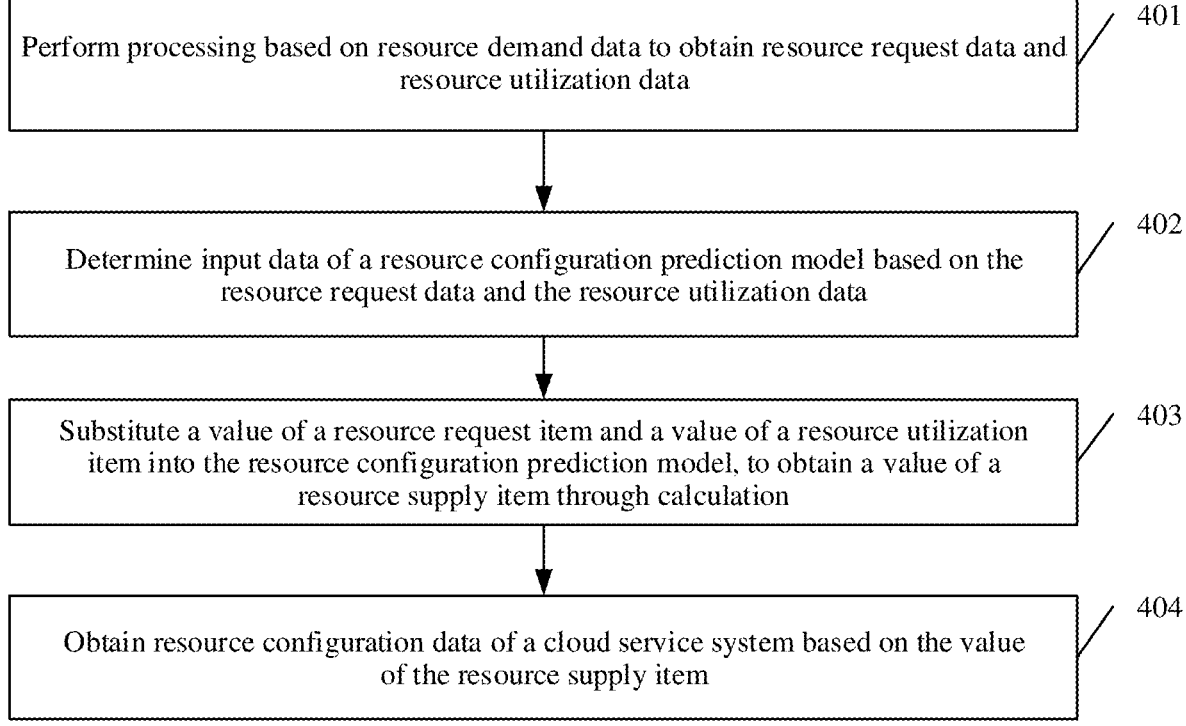

401 Perform processing based on resource demand data to obtain resource request data and resource utilization data 402 Determine input data of a resource configuration prediction model based on the resource request data and the resource utilization data 403 Substitute a value of a resource request item and a value of a resource utilization item into the resource configuration prediction model, to obtain a value of a resource supply item through calculation 404 Obtain resource configuration data of a cloud service system based on the value of the resource supply item

FIG. 4

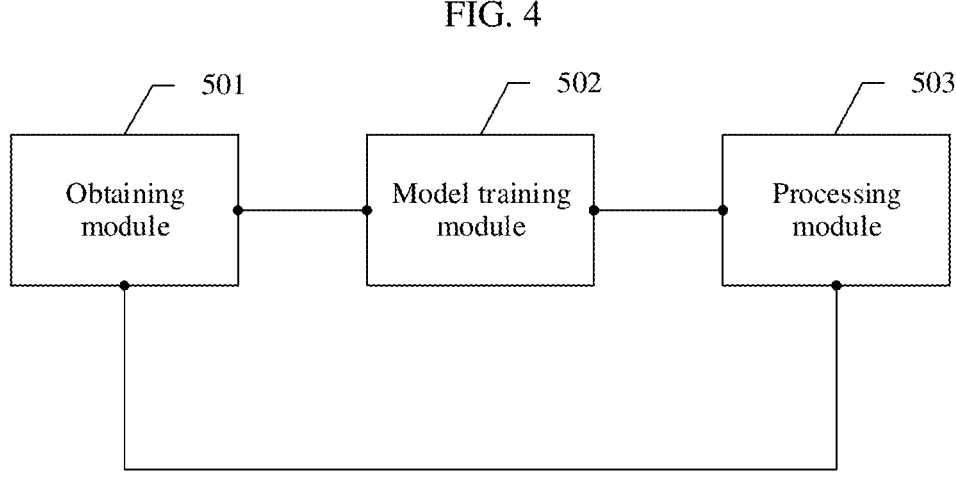

501 Obtaining module

502 Model training module

503 Processing module

FIG. 5

RESOURCE CONFIGURATION PREDICTION METHOD AND DEVICE

CROSS-REFERENCE TO RELATED APPLICATIONS

This application is a continuation of International Application No. PCT/CN2019/090892, filed on Jun. 12, 2019, which claims priority to Chinese Patent Application No. 201811004607.1, filed on Aug. 30, 2018, the disclosure of which is hereby incorporated by reference in its entirety.

TECHNICAL FIELD

This application relates to the field of cloud computing, and in particular, to a resource configuration prediction method and device.

BACKGROUND

As cloud computing technologies are maturing, more enterprises build cloud service systems to support their services and serve customers. Various services emerge to meet increasing demands A cloud service system needs to allocate an appropriate resource, for example, a virtual machine (VM), to each service. However, cloud service systems required by different enterprises have different scales. Therefore, types of cloud services and resource demands are also different. A cloud service system supplier sets a resource configuration for a cloud service mainly in two parts. First, before a cloud service system built by the supplier for an enterprise goes live, the supplier has to set a rational resource configuration for each component of each service in advance, to ensure that the component can run normally and meet a demand of the enterprise. Second, during running, the cloud service system needs to continuously adjust the resource configuration of the service component based on a load scale change.

Before the cloud service system goes live, a conventional cloud service supplier uses a test iteration method to set rational resource configurations for all service components. Specifically, a test environment is first built for the cloud service system, and then one conservative resource configuration or one experience-based resource configuration is provided for all cloud services, a pressure test is then performed on the entire cloud service system, and the resource configurations of the cloud services are adjusted based on a test result. The foregoing process repeats.

However, the following problems exist when the resource configuration of the cloud service is set in the foregoing conventional manner: An iteration period is long and a resource configuration cannot be quickly formulated for a new cloud service. For a large-scale cloud service system, it is difficult to build a test environment. Each time when a new cloud service is added, the entire cloud service system needs to be tested, and this is time-consuming and labor-intensive. The test environment is different from a production environment, and therefore a resource configuration feasible in the test environment may not be feasible in the production environment. Physical resource scaling of the cloud service system performed due to a scale change cannot be well predicted. The foregoing problems cause inaccurate resource allocation and planning during deployment and maintenance of the cloud service system. As a result, costs of the cloud service system are uncontrollable.

SUMMARY

This application provides a resource configuration prediction method and device applied to resource configuration prediction of a cloud service system, to improve resource allocation efficiency and reduce costs of the cloud service system.

A first aspect of this application provides a resource configuration prediction method, including:

obtaining original data of a cloud service system, where the original data includes running data of the cloud service system in a production environment or a production-like environment;

obtaining training data based on the original data, and performing deep learning based on the training data to construct and obtain a resource configuration prediction model;

when resource demand data input by a user is obtained, generating input data of the resource configuration prediction model based on the resource demand data; and performing prediction based on the input data and the resource configuration prediction model, to obtain resource configuration data of the cloud service system.

A data collector is used to collect the running data of the cloud service system in the production environment or the production-like environment. The running data in the production environment or the production-like environment can reflect a real status of the cloud service system during working. The original data may specifically include various operations, a monitoring log file or a database file, and the like. An objective is to construct and obtain the resource configuration prediction model by performing deep learning. Therefore, during deep learning, the training data used in a deep learning framework needs to be extracted from the original data, and the resource configuration prediction model can be constructed and obtained by performing deep learning based on the training data. If the user needs to use the cloud service system, the resource demand data is first set to obtain the resource demand data input by the user. The input data of the resource configuration prediction model is generated based on the resource demand data according to a principle applicable to the resource configuration prediction model. The input data is generated based on the resource demand data. Therefore, output data obtained after the resource configuration prediction model processes the input data is actually the resource configuration data of the cloud service system. The resource configuration prediction model is constructed and obtained based on the original data of the cloud service system, and then the resource configuration prediction model is used to predict the resource configuration data corresponding to the resource demand data. The original data is the running data of the cloud service system in the production environment or the production-like environment. Therefore, compared with setting a resource configuration of a cloud service in a conventional manner, constructing the resource configuration prediction model does not need to construct a test environment. During each resource adjustment, there is no need to test the entire cloud service system in the test environment provided that the resource configuration data is obtained through prediction by using the resource configuration prediction model. Therefore, resource allocation efficiency is improved, and costs of the cloud service system are reduced.

With reference to the first aspect of this application, in a first implementation, the obtaining training data based on the original data, and performing deep learning based on the training data to construct and obtain a resource configuration prediction model includes:

obtaining the training data by extracting the original data, where the training data includes a data metric item and a label metric item, the data metric item includes a resource request item and a resource utilization item, and the label metric item includes a resource supply item;

pre-processing the training data to obtain formatted data applicable to training of a deep learning model, where the deep learning model is the resource configuration prediction model; and performing deep learning training based on the formatted data, to construct and obtain the resource configuration prediction model.

The training data includes the data metric item and the label metric item, the data metric item includes the resource request item and the resource utilization item, and the label metric item includes the resource supply item. In deep learning, each piece of training data includes the data metric item and the label metric item. A resource configuration of the cloud service system needs to be predicted. Therefore, the training data is converted into the formatted data applicable to training of the deep learning model, and deep learning training is performed based on the formatted data, to construct and obtain a deep neural network model. The deep neural network model is the resource configuration prediction model. The training data includes the data metric item and the label metric item, the data metric item includes the resource request item and the resource utilization item, and the label metric item includes the resource supply item. Therefore, the resource configuration prediction model obtained based on the training data learns a relationship between the resource request item in the production environment and the resource supply item of the cloud service system in the production environment. The relationship between the resource request item and the resource supply item of the cloud service system is the resource utilization item.

With reference to the first implementation of the first aspect of this application, in a second implementation, the generating input data of the resource configuration prediction model based on the resource demand data includes:

performing processing based on the resource demand data to obtain resource request data and resource utilization data; and determining the input data of the resource configuration prediction model based on the resource request data and the resource utilization data, where the input data includes a value of the resource request item and a value of the resource utilization item of the resource configuration prediction model.

During deployment of the cloud service system, an enterprise that needs to deploy the cloud service system cannot provide such a large and specific metric item demand. The user (such as the enterprise) only inputs some simple system scales and some simple service demand data, for example, an account scale, a user scale, a virtual machine provisioning and management scale, concurrency, a type of a deployed service, and overall resource utilization of the cloud service system, that need to be supported by the cloud service system. To be specific, the input data of the resource configuration prediction model needs to be obtained based on these simple resource demand data. The input data of the resource configuration prediction model is the resource request data corresponding to the resource request item and the resource utilization data corresponding to the resource utilization item. The input data of the resource configuration prediction model is determined based on the resource request data and the resource utilization data. The input data includes the value of the resource request item and the value of the resource utilization item of the resource configuration prediction model.

With reference to the second implementation of the first aspect of this application, in a third implementation, the performing prediction based on the input data and the resource configuration prediction model, to obtain resource configuration data of the cloud service system includes:

obtaining the value of the resource request item and the value of the resource utilization item of the resource configuration prediction model based on the input data;

substituting the value of the resource request item and the value of the resource utilization item into the resource configuration prediction model, to obtain a value of the resource supply item through calculation; and obtaining the resource configuration data of the cloud service system based on the value of the resource supply item.

After the value of the resource request item and the value of the resource utilization item are obtained, the value of the resource supply item can be obtained by using the constructed resource configuration prediction model. The value of the resource supply item is actually a resource configuration of a service component of the cloud service system. Therefore, the resource configuration data of the cloud service system can be obtained based on the value of the resource supply item. The resource configuration prediction model has been constructed based on the training data. Therefore, a user that needs to build the cloud service system only needs to provide the simple resource demand data. The resource demand data may include the system scale, a resource demand, and the like. The resource request item and the resource utilization item can be correspondingly generated based on the resource demand data, and the resource configuration of the cloud service system is predicted by using the resource configuration prediction model, the resource request item, and the resource utilization item, to obtain the resource configuration data of the cloud service system.

With reference to the first implementation, the second implementation, or the third implementation of the first aspect of this application, in a fourth implementation, the method further includes:

storing the original data, the training data, and a model parameter of the resource configuration prediction model by using an object storage service.

The object storage service (OBS) is a storage service provided by the cloud service system, and can be used to store various types of data. Particularly, the original data is stored in the OBS after the original data of the cloud service system is obtained, the training data is stored in the OBS after the training data is obtained based on the original data, the formatted data is stored in the OBS after the training data is pre-processed to obtain the formatted data applicable to training of the deep learning model, and the model parameter is stored in the OBS after the resource configuration prediction model is constructed and obtained.

With reference to the fourth implementation of the first aspect of this application, in a fifth implementation, before the performing prediction based on the input data and the resource configuration prediction model, the method further includes:

obtaining the model parameter of the resource configuration prediction model by using the object storage service; and obtaining the resource configuration prediction model by loading the model parameter.

The model parameter of the resource configuration prediction model is stored in the OBS. Therefore, before prediction is performed based on the input data and the resource configuration prediction model, the model parameter of the resource configuration prediction model needs to be obtained by using the OBS, and the resource configuration prediction model is obtained by loading the model parameter.

A second aspect of this application provides a resource configuration prediction device, including:

an obtaining module, configured to obtain original data of a cloud service system, where the original data includes running data of the cloud service system in a production environment or a production-like environment;

a model training module, configured to: obtain training data based on the original data, and perform deep learning based on the training data to construct and obtain a resource configuration prediction model; and a processing module, configured to: when resource demand data input by a user is obtained, generate input data of the resource configuration prediction model based on the resource demand data; where the processing module is further configured to perform prediction based on the input data and the resource configuration prediction model, to obtain resource configuration data of the cloud service system.

The obtaining module uses a data collector to collect the running data of the cloud service system in the production environment or the production-like environment. The running data in the production environment or the production-like environment can reflect a real status of the cloud service system during working. The original data may specifically include various operations, a monitoring log file or a database file, and the like. An objective of the model training module is to construct and obtain the resource configuration prediction model by performing deep learning. Therefore, during deep learning, the model training module needs to extract the training data used in a deep learning framework from the original data, and can obtain the resource configuration prediction model through construction by performing deep learning based on the training data. If the user needs to use the cloud service system, the resource demand data is first set to obtain the resource demand data input by the user, and the processing module generates the input data of the resource configuration prediction model based on the resource demand data according to a principle applicable to the resource configuration prediction model. The input data is generated based on the resource demand data. Therefore, output data obtained after the resource configuration prediction model processes the input data is actually the resource configuration data of the cloud service system. The resource configuration prediction model is constructed and obtained based on the original data of the cloud service system, and then the resource configuration prediction model is used to predict the resource configuration data corresponding to the resource demand data. The original data is the running data of the cloud service system in the production environment or the production-like environment. Therefore, compared with setting a resource configuration of a cloud service in a conventional manner, constructing the resource configuration prediction model does not need to construct a test environment. During each resource adjustment, there is no need to test the entire cloud service system in the test environment provided that the resource configuration data is obtained through prediction by using the resource configuration prediction model. Therefore, resource allocation efficiency is improved, and costs of the cloud service system are reduced.

With reference to the second aspect of this application, in a first implementation, the model training module is configured to obtain the training data by extracting the original data, where the training data includes a data metric item and a label metric item, the data metric item includes a resource request item and a resource utilization item, and the label metric item includes a resource supply item;

the model training module is further configured to preprocess the training data to obtain formatted data applicable to training of a deep learning model, where the deep learning model is the resource configuration prediction model; and the model training module is further configured to perform deep learning training based on the formatted data, to construct and obtain the resource configuration prediction model.

The training data includes the data metric item and the label metric item, the data metric item includes the resource request item and the resource utilization item, and the label metric item includes the resource supply item. In deep learning, each piece of training data in the model training module includes the data metric item and the label metric item. A resource configuration of the cloud service system needs to be predicted. Therefore, the model training module converts the training data into the formatted data applicable to training of the deep learning model, and deep learning training is performed based on the formatted data, to construct and obtain a deep neural network model. The deep neural network model is the resource configuration prediction model. The training data includes the data metric item and the label metric item, the data metric item includes the resource request item and the resource utilization item, and the label metric item includes the resource supply item. Therefore, the resource configuration prediction model obtained based on the training data learns a relationship between the resource request item in the production environment and the resource supply item of the cloud service system in the production environment. The relationship between the resource request item and the resource supply item of the cloud service system is the resource utilization item.

With reference to the first implementation of the second aspect, in a second implementation, the processing module is further configured to perform processing based on the resource demand data to obtain resource request data and resource utilization data; and the processing module is further configured to determine the input data of the resource configuration prediction model based on the resource request data and the resource utilization data, where the input data includes a value of the resource request item and a value of the resource utilization item of the resource configuration prediction model.

During deployment of the cloud service system, an enterprise that needs to deploy the cloud service system cannot provide such a large and specific metric item demand. The user (such as the enterprise) only inputs some simple system scales and some simple service demand data, for example, an account scale, a user scale, a virtual machine provisioning and management scale, concurrency, a type of a deployed service, and overall resource utilization of the cloud service system, that need to be supported by the cloud service system. To be specific, the processing module needs to obtain the input data of the resource configuration prediction model based on these simple resource demand data. The input data of the resource configuration prediction model is the resource request data corresponding to the resource request item and the resource utilization data corresponding to the resource utilization item. The input data of the resource configuration prediction model is determined based on the resource request data and the resource utilization data. The input data includes the value of the resource request item and the value of the resource utilization item of the resource configuration prediction model.

With reference to the second implementation of the second aspect, in a third implementation, the processing module is further configured to obtain the value of the resource request item and the value of the resource utilization item of the resource configuration prediction model based on the input data;

the processing module is further configured to substitute the value of the resource request item and the value of the resource utilization item into the resource configuration prediction model, to obtain a value of the resource supply item through calculation; and the processing module is further configured to obtain the resource configuration data of the cloud service system based on the value of the resource supply item.

After obtaining the value of the resource request item and the value of the resource utilization item, the processing module can obtain the value of the resource supply item by using the constructed resource configuration prediction model. The value of the resource supply item is actually a resource configuration of a service component of the cloud service system. Therefore, the resource configuration data of the cloud service system can be obtained based on the value of the resource supply item. The resource configuration prediction model has been constructed based on the training data. Therefore, a user that needs to build the cloud service system only needs to provide the simple resource demand data. The resource demand data may include the system scale, a resource demand, and the like. The processing module can correspondingly generate the resource request item and the resource utilization item based on the resource demand data, and predict the resource configuration of the cloud service system by using the resource configuration prediction model, the resource request item, and the resource utilization item, to obtain the resource configuration data of the cloud service system.

With reference to the first implementation, the second implementation, or the third implementation of the second aspect of this application, in a fourth implementation, the resource configuration prediction device further includes a storage module.

The storage module is configured to store the original data, the training data, and a model parameter of the resource configuration prediction model by using an object storage service.

The OBS is a storage service provided by the cloud service system, and can be used to store various types of data. Particularly, the storage module stores the original data in the OBS after the obtaining module obtains the original data of the cloud service system, the storage module stores the training data in the OBS after the model training module obtains the training data based on the original data, the storage module stores the formatted data in the OBS after the model training module pre-processes the training data to obtain the formatted data applicable to training of the deep learning model, and the storage module stores the model parameter in the OBS after the model training module obtains the resource configuration prediction model through construction.

With reference to the fourth implementation of the second aspect, in a fifth implementation, the processing module is further configured to obtain the model parameter of the resource configuration prediction model by using the object storage service of the storage module; and the processing module is further configured to obtain the resource configuration prediction model by loading the model parameter.

The model parameter of the resource configuration prediction model is stored in the OBS. Therefore, before performing prediction based on the input data and the resource configuration prediction model, the processing module further needs to obtain the model parameter of the resource configuration prediction model by using the OBS of the storage module, and obtains the resource configuration prediction model by loading the model parameter.

A third aspect of this application provides a server, including:

a server interface circuit, configured to obtain original data of a cloud service system, where the original data includes running data of the cloud service system in a production environment or a production-like environment; and a processor, configured to obtain training data based on the original data, and perform deep learning based on the training data to construct and obtain a resource configuration prediction model; where the processor is further configured to: when resource demand data input by a user is obtained, generate input data of the resource configuration prediction model based on the resource demand data; and the processor is further configured to perform prediction based on the input data and the resource configuration prediction model, to obtain resource configuration data of the cloud service system.

The server interface circuit uses a data collector to collect the running data of the cloud service system in the production environment or the production-like environment. The running data in the production environment or the production-like environment can reflect a real status of the cloud service system during working. The original data may specifically include various operations, a monitoring log file or a database file, and the like. An objective of the processor is to construct and obtain the resource configuration prediction model by performing deep learning. Therefore, during deep learning, the processor needs to extract the training data used in a deep learning framework from the original data, and can obtain the resource configuration prediction model through construction by performing deep learning based on the training data. If the user needs to use the cloud service system, the resource demand data is first set to obtain the resource demand data input by the user. The processor generates the input data of the resource configuration prediction model based on the resource demand data according to a principle applicable to the resource configuration prediction model. The input data is generated based on the resource demand data. Therefore, output data obtained after the resource configuration prediction model processes the input data is actually the resource configuration data of the cloud service system. The resource configuration prediction model is constructed and obtained based on the original data of the cloud service system, and then the resource configuration prediction model is used to predict the resource configuration data corresponding to the resource demand data. The original data is the running data of the cloud service system in the production environment or the production-like environment. Therefore, compared with setting a resource configuration of a cloud service in a conventional manner, constructing the resource configuration prediction model does not need to construct a test environment. During each resource adjustment, there is no need to test the entire cloud service system in the test environment provided that the resource configuration data is obtained through prediction by using the resource configuration prediction model. Therefore, resource allocation efficiency is improved, and costs of the cloud service system are reduced.

A fourth aspect of this application provides a chip system, including: applied to a resource configuration prediction device. The chip system includes at least one processor and an interface circuit. The interface circuit and the at least one processor are interconnected by using a cable, and the at least one processor performs an operation of the resource configuration prediction device in the implementations of the second aspect.

A fifth aspect of this application provides a computer-readable storage medium, including: applied to a resource configuration prediction device. The computer-readable storage medium stores an instruction, and when the instruction is run on a computer, the computer is enabled to perform an operation of the resource configuration prediction device in the implementations of the second aspect.

A sixth aspect of this application provides a computer program product including an instruction. When the computer program product runs on a computer, the computer is enabled to perform an operation of the resource configuration prediction device in the implementations of the second aspect.

BRIEF DESCRIPTION OF DRAWINGS

FIG. 1 is a schematic flowchart of an embodiment of a resource configuration prediction method according to this application;

FIG. 2 is a schematic diagram of a procedure of constructing a resource configuration prediction model according to this application;

FIG. 4 is a schematic flowchart of another embodiment of a resource configuration prediction method according to this application;

FIG. 5 is a schematic structural diagram of an embodiment of a resource configuration prediction device according to this application;

DESCRIPTION OF EMBODIMENTS

Figure 3:
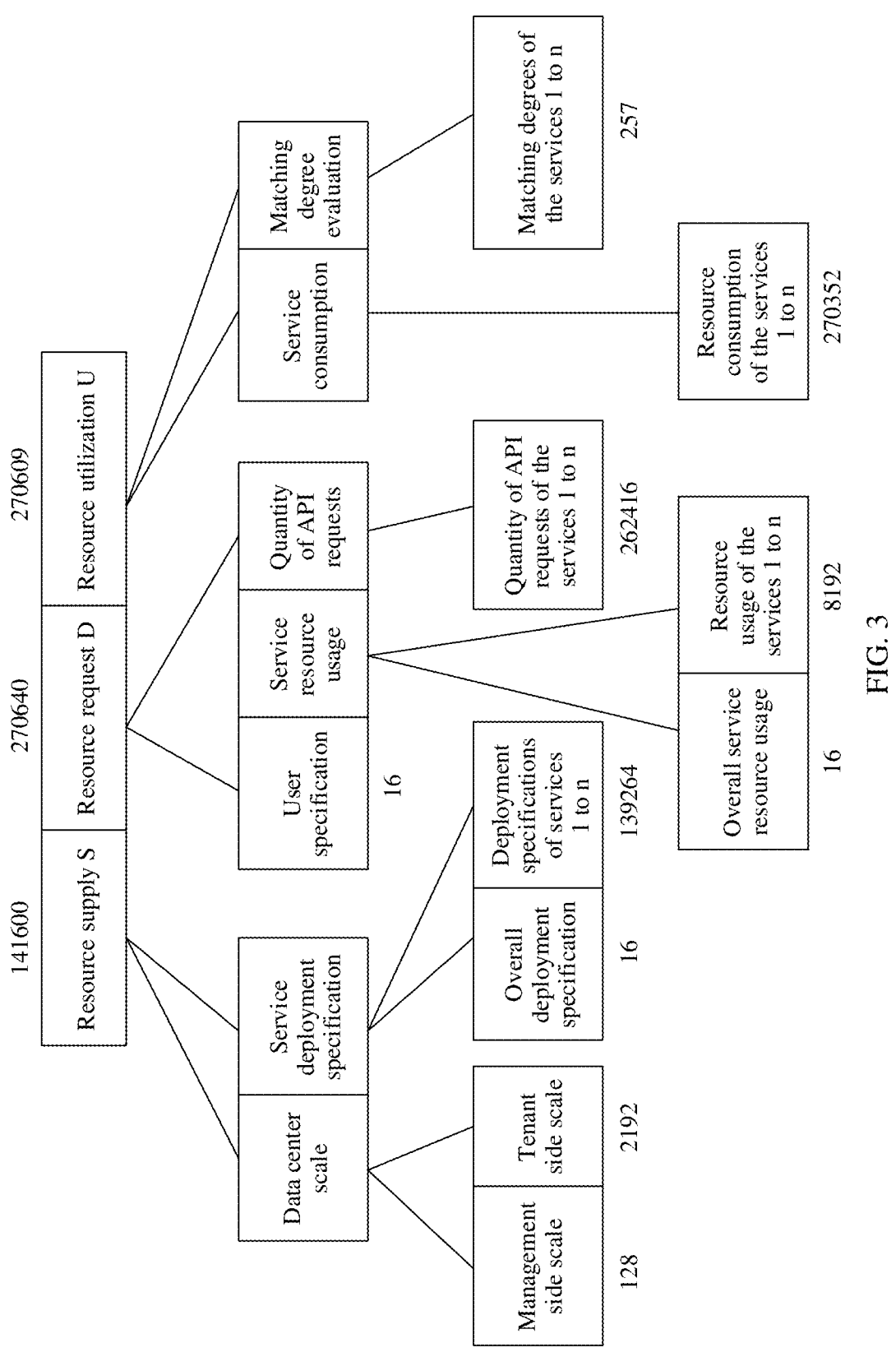
FIG. 3 is a schematic composition diagram of training data according to this application.

This application provides a resource configuration prediction method and device applied to resource configuration prediction of a cloud service system, to improve resource allocation efficiency and reduce costs of the cloud service system.

Terms "uplink" and "downlink" in this application are used to describe data/information transmission directions in some scenarios. For example, an "uplink" direction is a direction in which data/information is transmitted from a terminal device to a network side, and a "downlink" direction is a direction in which data/information is transmitted from the network side to the terminal device. "Uplink" and "downlink" are used to describe only directions. Neither a specific device from which data/information transmission starts nor a specific device at which data/information transmission stops is limited.

The term "and/or" in this application may be an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In this application, names may be assigned to various types of objects such as messages/information/devices/network elements/systems/apparatuses/actions/operations/procedures/concepts. However, these specific names do not constitute a limitation to the related objects. The assigned names may vary with a factor such as a scenario, a context, or a usage habit. An understanding of a technical meaning of a related object should be mainly determined from a function and a technical effect that are embodied/performed in a technical solution.

In the specification, claims, and accompanying drawings of this application, terms "first", "second", and the like are intended to distinguish similar objects but do not necessarily indicate a specific order or sequence. It should be understood that data termed in such a way are interchangeable in proper circumstances so that embodiments described herein can be implemented in other orders than the order illustrated or described herein. Moreover, terms "include", "contain" and any other variant thereof mean to cover non-exclusive inclusion. For example, a process, a method, a system, a product, or a device that includes a series of steps or modules is not necessarily limited to expressly listing those steps or modules, but may include other steps or modules not expressly listed or inherent to the process, the method, the system, the product, or the device. Naming or numbering of the steps in this application does not mean that the steps in the method procedures need to be performed in a time/logical sequence indicated by naming or numbering. An execution order of the steps in the procedures that have been named or numbered can be changed according to the technical objective to be achieved, as long as same or similar technical effects can be achieved. Division into modules in this application is logical division and may be other division in actual application implementation. For example, a plurality of modules may be combined or integrated into another system, or some features may be ignored or not performed. In addition, the displayed or discussed mutual couplings, direct couplings, or communication connections may be implemented through some interfaces. The indirect couplings or communication connections between the modules may be implemented in electronic or another form. This is not limited in this application. In addition, modules or sub-modules described as separate components may be or may not be physically separated, or may be or may not be physical modules, or may be distributed to a plurality of circuit modules. Objectives of the solutions of this application may be achieved by selecting some or all of the modules based on actual demands.

First, a system architecture or a scenario to which this application is applied is briefly described.

This application is applied to a resource configuration of the cloud service system. As cloud computing technologies are maturing, more enterprises build cloud service systems to support their services and serve customers. Various services emerge to meet increasing demands A cloud service system needs to allocate an appropriate resource, for example, a VM, to each service. However, cloud service systems required by different enterprises have different scales. Therefore, types of cloud services and resource demands are also different. A cloud service system supplier sets a resource configuration for a cloud service mainly in two parts. First, before a cloud service system built by the supplier for an enterprise goes live, the supplier has to set a rational resource configuration for each component of each service in advance, to ensure that the component can run normally and meet a demand of the enterprise. Second, during running, the cloud service system needs to continuously adjust the resource configuration of the service component based on a load scale change. Before the cloud service system goes live, a conventional cloud service supplier uses a test iteration method to set rational resource configurations for all service components. Specifically, a test environment is first built for the cloud service system, and then one conservative resource configuration or one experience-based resource configuration is provided for all cloud services, a pressure test is then performed on the entire cloud service system, and the resource configurations of the cloud services are adjusted based on a test result. The foregoing process repeats.

However, in the foregoing conventional manner, an iteration period is long and a resource configuration cannot be quickly formulated for a new cloud service. For a large-scale cloud service system, it is difficult to build a test environment. Each time when a new cloud service is added, the entire cloud service system needs to be tested, and this is time-consuming and labor-intensive. The test environment is different from a production environment, and therefore a resource configuration feasible in the test environment may not be feasible in the production environment. Physical resource scaling of the cloud service system performed due to a scale change cannot be well predicted. The foregoing problems cause inaccurate resource allocation and planning during deployment and maintenance of the cloud service system. As a result, costs of the cloud service system are uncontrollable.

To resolve the foregoing problems, as shown in FIG. 1, an embodiment of this application provides a resource configuration prediction method, including the following steps.

101: Obtain original data of a cloud service system, where the original data includes running data of the cloud service system in a production environment or a production-like environment.

In this embodiment, the cloud service system is a cloud system provided by a cloud service supplier for a user to use a cloud service, and the user may be an enterprise. In addition to a public cloud, the cloud service system is applicable to another cloud system, for example, a private cloud, a hybrid cloud, an edge cloud, or a satellite cloud. Generally, a data collection device such as a sensor may be used as a data collector to collect the running data of the cloud service system in the production environment or the production-like environment. The running data in the production environment or the production-like environment can reflect a real status of the cloud service system during working. The original data may specifically include various operations, a monitoring log file or a database file, and the like.

102: Obtain training data based on the original data, and perform deep learning based on the training data to construct and obtain a resource configuration prediction model.

In this embodiment, an objective is to construct and obtain the resource configuration prediction model by performing deep learning. Therefore, the original data cannot be used to perform deep learning, the training data used in a deep learning framework needs to be extracted from the original data, and the resource configuration prediction model can be constructed and obtained by performing deep learning based on the training data.

103: When resource demand data input by the user is obtained, generate input data of the resource configuration prediction model based on the resource demand data.

In this embodiment, after the resource configuration prediction model has been constructed, if the user needs to use the cloud service system, the resource demand data is first set to obtain the resource demand data input by the user. The input data of the resource configuration prediction model is generated based on the resource demand data according to a principle applicable to the resource configuration prediction model.

104: Perform prediction based on the input data and the resource configuration prediction model, to obtain resource configuration data of the cloud service system.

In this embodiment, the input data is generated based on the resource demand data. Therefore, output data obtained after the resource configuration prediction model processes the input data is actually the resource configuration data of the cloud service system.

In this embodiment of this application, the resource configuration prediction model is constructed and obtained based on the original data of the cloud service system, and then the resource configuration prediction model is used to predict the resource configuration data corresponding to the resource demand data. The original data is the running data of the cloud service system in the production environment or the production-like environment. Therefore, compared with setting a resource configuration of a cloud service in a conventional manner, constructing the resource configuration prediction model does not need to construct a test environment. During each resource adjustment, there is no need to test the entire cloud service system in the test environment provided that the resource configuration data is obtained through prediction by using the resource configuration prediction model. Therefore, resource allocation efficiency is improved, and costs of the cloud service system are reduced.

In the foregoing embodiment shown in FIG. 1, how to construct the resource configuration prediction model is not specifically described. The following provides detailed description by using a specific embodiment.

Referring to FIG. 2, based on the embodiment shown in FIG. 1, in some embodiments of this application, a procedure of obtaining training data based on the original data, and performing deep learning based on the training data to construct and obtain a resource configuration prediction model includes the following steps.

201: Obtain the original data of the cloud service system. For details, refer to the step 101 in the embodiment shown in FIG. 1.

202: Obtain the training data by extracting the original data.

In this embodiment, the training data includes a data metric item and a label metric item, the data metric item includes a resource request item and a resource utilization item, and the label metric item includes a resource supply item. Specifically, as shown in FIG. 3, the data metric item and the label metric item of the training data are respectively: resource supply S, resource request D (resource Demand), and resource utilization U.

The resource supply S includes two types: a data center specification and a service deployment specification (service specification). The data center specification includes a management side resource scale (Manage resource pool) and a tenant side resource scale (tenant resource pool). The management side resource scale and the tenant side resource scale each include a corresponding computing pool specification (for example, a quantity of computing nodes, a quantity of central processing unit (CPU) cores, a quantity of node Hertz, a memory, or a magnetic disk), a storage pool specification (for example, a quantity of storage nodes, total storage space, or available space), and a network pool scale (for example, a quantity of switches or a quantity of network ports). The service deployment specification includes an overall deployment specification (Overall Flavor) and deployment specifications of services 1 to n (Service Flavor). The deployment specifications of the services include deployment specifications (Flavor) of components 1 to m of the services. The deployment specification of each component includes t-type resources such as a CPU, a memory, and/or a magnetic disk (for example, deployment specifications of a HUAWEI CLOUD general-purpose virtual machine s3.small are one vCPU and 1 GB memory).

The resource request D includes three types: a user scale (Consumer Specification), resource usage of the services (Service Resource Allocation), and a quantity of application programming interface (API) requests (API Request Specification). The user scale includes a quantity of cloud service system accounts, a quantity of users, and the like. The resource usage of the services includes a total quantity of resources used by a tenant for the services and required resource usage for the services 1 to n. For example, for a computing service such as a HUAWEI CLOUD elastic cloud server (ECS) service, a quantity of required resources include a quantity of virtual machines, a quantity of storage volumes, a quantity of networks, and the like requested by all tenants. The quantity of API requests includes a quantity of requests of all p-type APIs in each service. All services have different types and quantities of APIs.

The resource utilization U is used to measure service resource consumption (Service utilization) of the services when a tenant resource request of the cloud service system is D and resource supply of the cloud service system is S. In addition, matching degree evaluation (supply & demand matching Evaluation) between the resource supply S and the resource request D may be performed based on the resource consumption of the services. The resource consumption of the services 1 to n includes utilization of r-type resources by all components 1 to m of the services, for example, CPU utilization, memory utilization, and/or network bandwidth usage. The matching degree evaluation of the services is performed based on the resource utilization. For example, in a HUAWEI CLOUD system, an expected average utilization of a CPU of a virtual machine ranges from 30% to 40% and a peak of the CPU ranges from 50% to 60%, and that average utilization of a memory ranges from 60% to 70%, and a peak of the memory ranges from 80% to 90%.

In this embodiment, it is assumed that a quantity of types of cloud services in the training data is n=256, a quantity of types of components included in each service is m=32, a quantity of types of resources included in a deployment specification of each component is t=16, a quantity of types of APIs included in each service is p=1024, and a quantity of types of resources consumed by each service is r=32. According to the foregoing configurations, each piece of training data includes a total of 682849 metric items. A specific quantity of items included in each type of metric item is shown in FIG. 3. In addition, in this embodiment, a time span of each piece of training data is 5 minutes. Therefore, 24×12=288 pieces of training data may be obtained from a production environment every day by using a data collector.

203: Pre-process the training data to obtain formatted data applicable to training of a deep learning model, where the deep learning model is the resource configuration prediction model.

In this embodiment, in deep learning, each piece of training data includes the data metric item and the label metric item. A resource configuration of the cloud service system needs to be predicted. To be specific, in the metric items of the training data in the step 202, the resource supply S is the label item, and the resource request D and the resource utilization U are the data items. Therefore, the resource request D and the resource utilization U in the training data need to be used as the data items, and the resource supply S needs to be used as the label item. The training data is converted into a data type required for training of a deep learning framework. For example, data of a TFRecord type of a Google artificial intelligence learning system Tensorflow may be used as the formatted data.

204: Perform deep learning training based on the formatted data, to construct and obtain the resource configuration prediction model.

In this embodiment, deep learning training may be performed by using a deep neural network (DNN), a convolutional neural network (CNN), or the like. The deep neural network includes a quantity L of neural network layers, a quantity $l_i$ ($0<i<=L$) of neurons at each layer, a cost function mean squared error (MSE), an activation function such as a rectified linear unit (ReLu), and the like. Deep learning training is performed based on the formatted data, to construct and obtain a deep neural network model. The deep neural network model is the resource configuration prediction model.

In this embodiment of this application, how the resource configuration prediction model is obtained through training is described in detail. The training data includes the data metric item and the label metric item, the data metric item includes the resource request item and the resource utilization item, and the label metric item includes the resource supply item. Therefore, the resource configuration prediction model obtained based on the training data learns a relationship between the resource request D in the production environment and the resource supply S of the cloud service system in the production environment. The relationship between the resource request D and the resource supply S of the cloud service system is the resource utilization U.

According to the description in the embodiment shown in FIG. 2, after the resource configuration prediction model is constructed and obtained, the resource configuration of the cloud service system may be predicted by using the resource configuration prediction model. A specific implementation is described in the following embodiment.

Referring to FIG. 4, based on the embodiments shown in FIG. 1 and FIG. 2, an embodiment of this application provides a resource configuration prediction method, including the following steps.

401: Perform processing based on the resource demand data to obtain resource request data and resource utilization data.

In this embodiment, as shown in FIG. 3, a quantity of metric items of the resource request D and a quantity of metric items of the resource utilization U are 270640 and 270609, respectively. During deployment of the cloud service system, an enterprise that needs to deploy the cloud service system cannot provide such a large and specific metric item demand. The user (such as the enterprise) only inputs some simple system scales and some simple service demand data, for example, an account scale, a user scale, a virtual machine provisioning and management scale, concurrency, a type of a deployed service, and overall resource utilization of the cloud service system, that need to be supported by the cloud service system. To be specific, the input data of the resource configuration prediction model needs to be obtained based on these simple resource demand data. The input data of the resource configuration prediction model is the resource request data corresponding to the resource request item and the resource utilization data corresponding to the resource utilization item.

402: Determine the input data of the resource configuration prediction model based on the resource request data and the resource utilization data, where the input data includes a value of the resource request item and a value of the resource utilization item of the resource configuration prediction model.

In this embodiment, it is assumed that the resource utilization data input by the user is CPU utilization of 60% and memory utilization of 70%. In this case, it may be obtained that utilization values of all CPUs in the resource utilization item are 60%, and a value of the memory utilization is 70%. If the resource utilization data is not specified in the resource utilization item, the resource utilization data may be set to a default value. A quantity of API demands in the resource request item may be set to a grade C (for example, C=10) based on the concurrency. Then, a quantity of API demands of a corresponding grade is selected based on concurrency input by the user, to obtain the value of the resource request item.

403: Substitute the value of the resource request item and the value of the resource utilization item into the resource configuration prediction model, to obtain a value of the resource supply item through calculation.

In this embodiment, after the value of the resource request item and the value of the resource utilization item are obtained, the value of the resource supply item can be obtained by using the resource configuration prediction model constructed in the embodiment shown in FIG. 2.

404: Obtain the resource configuration data of the cloud service system based on the value of the resource supply item.

In this embodiment, the value of the resource supply item is actually a resource configuration of a service component of the cloud service system. Therefore, the resource configuration data of the cloud service system can be obtained based on the value of the resource supply item.

In this embodiment of this application, the resource configuration prediction model has been constructed based on training data. Therefore, a user that needs to build the cloud service system only needs to provide the simple resource demand data. The resource demand data may include the system scale, a resource demand, and the like. The resource request item and the resource utilization item can be correspondingly generated based on the resource demand data, and the resource configuration of the cloud service system is predicted by using the resource configuration prediction model, the resource request item, and the resource utilization item, to obtain the resource configuration data of the cloud service system.

It should be noted that the original data, the training data, and a model parameter of the resource configuration prediction model may further be stored by using an OBS. Therefore, before prediction is performed based on the input data and the resource configuration prediction model, the model parameter of the resource configuration prediction model needs to be obtained by using the OBS, and the resource configuration prediction model is obtained by loading the model parameter.

The foregoing embodiment describes the resource configuration prediction method.

The following describes, by using an embodiment, a resource configuration prediction device to which the method is applied.

Referring to FIG. 5, an embodiment of this application provides a resource configuration prediction device, including:

an obtaining module 501, configured to obtain original data of a cloud service system, where the original data includes running data of the cloud service system in a production environment or a production-like environment;

a model training module 502, configured to: obtain training data based on the original data, and perform deep learning based on the training data to construct and obtain a resource configuration prediction model; and a processing module 503, configured to: when resource demand data input by a user is obtained, generate input data of the resource configuration prediction model based on the resource demand data; where the processing module 503 is further configured to perform prediction based on the input data and the resource configuration prediction model, to obtain resource configuration data of the cloud service system.

In this embodiment of this application, the obtaining module 501 uses a data collector to collect the running data of the cloud service system in the production environment or the production-like environment. The running data in the production environment or the production-like environment can reflect a real status of the cloud service system during working. The original data may specifically include various operations, a monitoring log file or a database file, and the like. An objective of the model training module 502 is to construct and obtain the resource configuration prediction model by performing deep learning. Therefore, during deep learning, the model training module 502 needs to extract the training data used in a deep learning framework from the original data, and can obtain the resource configuration prediction model through construction by performing deep learning based on the training data. If the user needs to use the cloud service system, the resource demand data is first set to obtain the resource demand data input by the user. The processing module 503 generates the input data of the resource configuration prediction model based on the resource demand data according to a principle applicable to the resource configuration prediction model. The input data is generated based on the resource demand data. Therefore, output data obtained after the resource configuration prediction model processes the input data is actually the resource configuration data of the cloud service system. The resource configuration prediction model is constructed and obtained based on the original data of the cloud service system, and then the resource configuration prediction model is used to predict the resource configuration data corresponding to the resource demand data. The original data is the running data of the cloud service system in the production environment or the production-like environment. Therefore, compared with setting a resource configuration of a cloud service in a conventional manner, constructing the resource configuration prediction model does not need to construct a test environment. During each resource adjustment, there is no need to test the entire cloud service system in the test environment provided that the resource configuration data is obtained through prediction by using the resource configuration prediction model. Therefore, resource allocation efficiency is improved, and costs of the cloud service system are reduced.

Optionally, with reference to the embodiment shown in FIG. 5, in some embodiments of this application, the model training module 502 is configured to obtain the training data by extracting the original data, where the training data includes a data metric item and a label metric item, the data metric item includes a resource request item and a resource utilization item, and the label metric item includes a resource supply item;

the model training module 502 is further configured to pre-process the training data to obtain formatted data applicable to training of a deep learning model, where the deep learning model is the resource configuration prediction model; and the model training module 502 is further configured to perform deep learning training based on the formatted data, to construct and obtain the resource configuration prediction model.

In this embodiment of this application, the training data includes the data metric item and the label metric item, the data metric item includes the resource request item and the resource utilization item, and the label metric item includes the resource supply item. In deep learning, each piece of training data in the model training module 502 includes the data metric item and the label metric item. A resource configuration of the cloud service system needs to be predicted. Therefore, the model training module 502 converts the training data into the formatted data applicable to training of the deep learning model, and deep learning training is performed based on the formatted data, to obtain a deep neural network model through construction. The deep neural network model is the resource configuration prediction model. The training data includes the data metric item and the label metric item, the data metric item includes the resource request item and the resource utilization item, and the label metric item includes the resource supply item. Therefore, the resource configuration prediction model obtained based on the training data learns a relationship between the resource request item in the production environment and the resource supply item of the cloud service system in the production environment. The relationship between the resource request item and the resource supply item of the cloud service system is the resource utilization item.

Optionally, with reference to the embodiment shown in FIG. 5, in some embodiments of this application, the processing module 503 is further configured to perform processing based on the resource demand data to obtain resource request data and resource utilization data; and the processing module 503 is further configured to determine the input data of the resource configuration prediction model based on the resource request data and the resource utilization data, where the input data includes a value of the resource request item and a value of the resource utilization item of the resource configuration prediction model.

In this embodiment of this application, during deployment of the cloud service system, an enterprise that needs to deploy the cloud service system cannot provide such a large and specific metric item demand. The user (such as the enterprise) only inputs some simple system scales and some simple service demand data, for example, an account scale, a user scale, a virtual machine provisioning and management scale, concurrency, a type of a deployed service, and overall resource utilization of the cloud service system, that need to be supported by the cloud service system. To be specific, the processing module 503 needs to obtain the input data of the resource configuration prediction model based on these simple resource demand data. The input data of the resource configuration prediction model is the resource request data corresponding to the resource request item and the resource utilization data corresponding to the resource utilization item. The input data of the resource configuration prediction model is determined based on the resource request data and the resource utilization data. The input data includes the value of the resource request item and the value of the resource utilization item of the resource configuration prediction model.

Optionally, with reference to the embodiment shown in FIG. 5, in some embodiments of this application, the processing module 503 is further configured to obtain the value of the resource request item and the value of the resource utilization item of the resource configuration prediction model based on the input data;

the processing module 503 is further configured to substitute the value of the resource demand item and the value of the resource utilization item into the resource configuration prediction model, to obtain a value of the resource supply item through calculation; and the processing module 503 is further configured to obtain the resource configuration data of the cloud service system based on the value of the resource supply item.

In this embodiment of this application, after obtaining the value of the resource request item and the value of the resource utilization item, the processing module 503 can obtain the value of the resource supply item by using the constructed resource configuration prediction model. The value of the resource supply item is actually a resource configuration of a service component of the cloud service system. Therefore, the resource configuration data of the cloud service system can be obtained based on the value of the resource supply item. The resource configuration prediction model has been constructed based on the training data. Therefore, a user that needs to build the cloud service system only needs to provide the simple resource demand data. The resource demand data may include the system scale, a resource demand, and the like. The processing module 503 can correspondingly generate the resource request item and the resource utilization item based on the resource demand data, and predict the resource configuration of the cloud service system by using the resource configuration prediction model, the resource request item, and the resource utilization item, to obtain the resource configuration data of the cloud service system.

Figure 6:
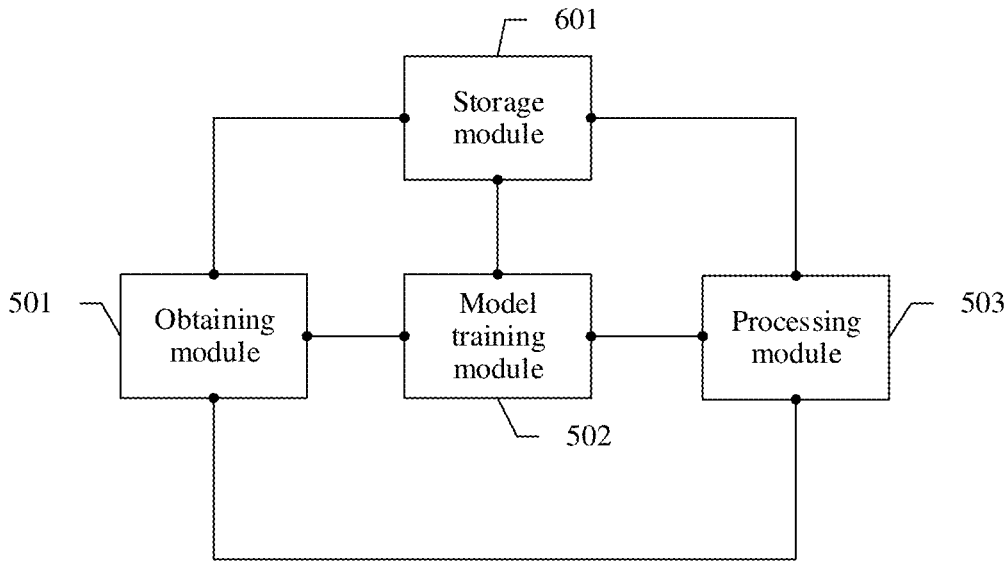
FIG. 6 is a schematic structural diagram of another embodiment of a resource configuration prediction device according to this application.

Optionally, with reference to an embodiment shown in FIG. 6, in some embodiments of this application, the resource configuration prediction device further includes a storage module 601.

The storage module 601 is configured to store the original data, the training data, and a model parameter of the resource configuration prediction model by using an object storage service.

In this embodiment of this application, the OBS is a storage service provided by the cloud service system, and can be used to store various types of data. Particularly, the storage module 601 stores the original data in the OBS after the obtaining module 501 obtains the original data of the cloud service system, the storage module 601 stores the training data in the OBS after the model training module 502 obtains the training data based on the original data, the storage module 601 stores the formatted data in the OBS after the model training module 502 pre-processes the training data to obtain the formatted data applicable to training of the deep learning model, and the storage module 601 stores the model parameter in the OBS after the model training module 502 obtains the resource configuration prediction model through construction.

Optionally, with reference to the embodiment shown in FIG. 6, in some embodiments of this application, the processing module 503 is further configured to obtain the model parameter of the resource configuration prediction model by using the object storage service of the storage module 601; and the processing module 503 is further configured to obtain the resource configuration prediction model by loading the model parameter.

In this embodiment of this application, the model parameter of the resource configuration prediction model is stored in the OBS. Therefore, before performing prediction based on the input data and the resource configuration prediction model, the processing module 503 further needs to obtain the model parameter of the resource configuration prediction model by using the OBS of the storage module 601, and obtains the resource configuration prediction model by loading the model parameter.

In the foregoing embodiments, the resource configuration prediction device is described by using a modular apparatus structure. During specific implementation, the resource configuration prediction device may be a server in the cloud service system. See the information below for details.

Figure 7:
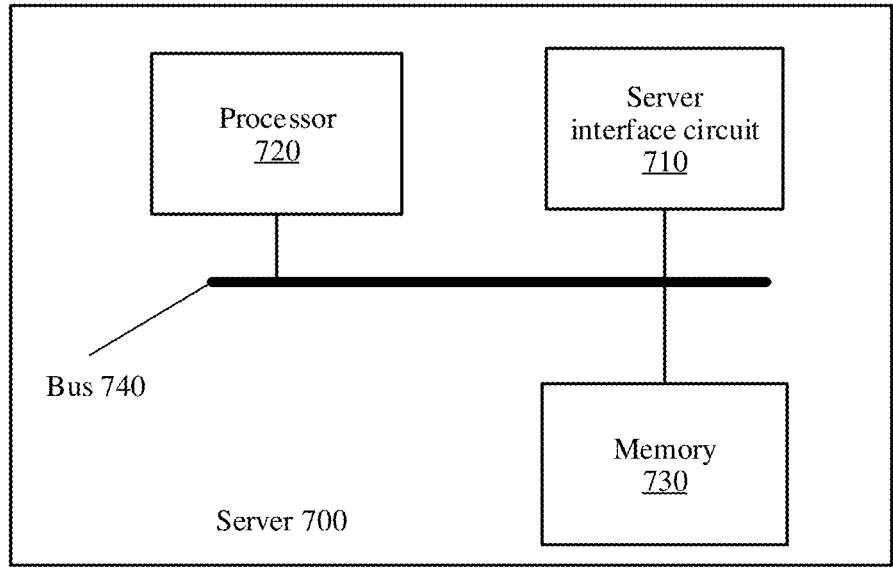
FIG. 7 is a schematic structural diagram of a server according to this application.

Referring to FIG. 7, an embodiment of this application provides a server 700, including:

a server interface circuit 710, configured to obtain original data of a cloud service system, where the original data includes running data of the cloud service system in a production environment or a production-like environment; and a processor 720, configured to obtain training data based on the original data, and perform deep learning based on the training data to construct and obtain a resource configuration prediction model; where the processor 720 is further configured to: when resource demand data input by a user is obtained, generate input data of the resource configuration prediction model based on the resource demand data; and the processor 720 is further configured to perform prediction based on the input data and the resource configuration prediction model, to obtain resource configuration data of the cloud service system.

In this embodiment of this application, the server interface circuit 710 uses a data collector to collect the running data of the cloud service system in the production environment or the production-like environment. The running data in the production environment or the production-like environment can reflect a real status of the cloud service system during working. The original data may specifically include various operations, a monitoring log file or a database file, and the like. An objective of the processor 720 is to construct and obtain the resource configuration prediction model by performing deep learning. Therefore, during deep learning, the processor 720 needs to extract the training data used in a deep learning framework from the original data, and can obtain the resource configuration prediction model through construction by performing deep learning based on the training data. If the user needs to use the cloud service system, the resource demand data is first set to obtain the resource demand data input by the user. The processor 720 generates the input data of the resource configuration prediction model based on the resource demand data according to a principle applicable to the resource configuration prediction model. The input data is generated based on the resource demand data. Therefore, output data obtained after the resource configuration prediction model processes the input data is actually the resource configuration data of the cloud service system. The resource configuration prediction model is constructed and obtained based on the original data of the cloud service system, and then the resource configuration prediction model is used to predict the resource configuration data corresponding to the resource demand data. The original data is the running data of the cloud service system in the production environment or the production-like environment. Therefore, compared with setting a resource configuration of a cloud service in a conventional manner, constructing the resource configuration prediction model does not need to construct a test environment. During each resource adjustment, there is no need to test the entire cloud service system in the test environment provided that the resource configuration data is obtained through prediction by using the resource configuration prediction model. Therefore, resource allocation efficiency is improved, and costs of the cloud service system are reduced.

It should be noted that the server 700 may further include a memory 730. The memory 730 is coupled to the processor 720, and the memory 730 stores a program instruction and data that are necessary for the server 700.

A part of the memory 730 may further include a non-volatile random access memory (NVRAM). The memory 730 stores the following elements: an executable module or a data structure, a subset thereof, or an extended set thereof.

A corresponding operation is performed by invoking an operation instruction (the operation instruction may be stored in an operating system) stored in the memory 730. The processor 720 controls an operation of the server 700, and the processor 720 may also be referred to as a CPU. The memory 730 may include a read-only memory and a random access memory, and provide an instruction and data for the processor 720. In a specific application, components of the server 700 are coupled together by using a bus system 740. In addition to a data bus, the bus system 740 includes a power bus, a control bus, a status signal bus, and the like. However, for clear description, various types of buses in the figure are marked as the bus system 740.

Figure 8:
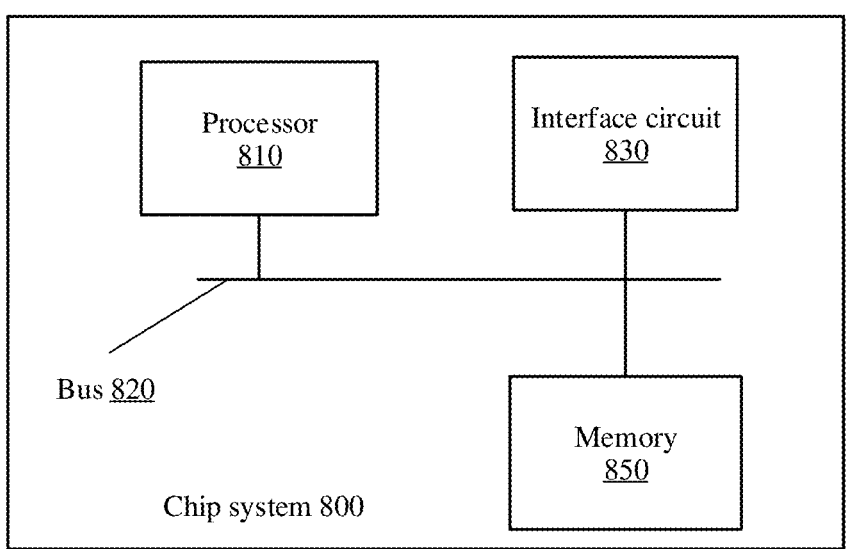
FIG. 8 is a schematic structural diagram of a chip system according to this application.

FIG. 8 is a schematic structural diagram of a chip system 800 according to an embodiment of this application. The chip system 800 includes at least one processor 810 and an interface circuit 830. The interface circuit 830 is interconnected to the at least one processor 810 by using a cable.

Optionally, as shown in FIG. 8, in some implementations of this application, the chip system 800 further includes a memory 850. The memory 850 may include a read-only memory and a random access memory, and provide an operation instruction and data for the processor 810. A part of the memory 850 may further include a NVRAM.

In some implementations, the memory 850 stores the following elements: an executable module or a data structure, a subset thereof, or an extended set thereof.

In this embodiment of this application, a corresponding operation is performed by invoking the operation instruction (the operation instruction may be stored in an operating system) stored in the memory 850.

The processor 810 controls an operation of a network element device, and the processor 810 may also be referred to as a CPU. The memory 850 may include a read-only memory and a random access memory, and provide an instruction and data for the processor 810. A part of the memory 850 may further include a non-volatile random access memory (NVRAM). In a specific application, components are coupled together by using a bus system 820. In addition to a data bus, the bus system 820 includes a power bus, a control bus, a status signal bus, and the like. However, for clear description, various types of buses in the figure are marked as the bus system 820.

The methods disclosed in the foregoing embodiments of this application may be applied to the processor 810 or may be implemented by the processor 810. The processor 810 may be an integrated circuit chip and has a signal processing capability. In an implementation process, the steps in the foregoing methods can be accomplished by using a hardware integrated logic circuit in the processor 810 or by using instructions in a form of software. The processor 810 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, the steps, and logical block diagrams that are disclosed in the embodiments of this application may be implemented or performed. The general-purpose processor may be a microprocessor, or the processor may be any conventional processor or the like. The steps of the methods disclosed with reference to the embodiments of this application may be directly executed and accomplished by using a hardware decoding processor, or may be executed and accomplished by using a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory 850, and the processor 810 reads information in the memory 850 and accomplishes the steps in the foregoing methods in combination with hardware of the processor.

In the foregoing embodiments, the instruction that is stored in the memory and that is to be executed by the processor may be implemented in a form of a computer program product. The computer program product may be written into the memory in advance, or may be downloaded and installed in the memory in the form of software.

This application further provides a computer-readable storage medium. The computer-readable storage medium stores an instruction. When the instruction is run on a computer, the computer is enabled to perform the resource configuration prediction methods described in the foregoing embodiments.

This application further provides a computer program product including an instruction. When the computer program product runs on a computer, the computer is enabled to perform the resource configuration prediction methods described in the foregoing embodiments.

All or some of the foregoing embodiments may be implemented by using software, hardware, firmware, or any combination thereof. When software is used to implement the embodiments, the embodiments may be implemented in a form of a computer program product.

The computer program product includes one or more computer instructions. When the computer program instructions are loaded and executed on a computer, the procedure or the functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be understood that sequence numbers of the foregoing processes do not mean execution sequences in various embodiments of this application. The execution sequences of the processes should be determined based on functions and internal logic of the processes, and should not construct any limitation on the implementation processes of the embodiments of this application.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A resource allocation prediction method, comprising:
extracting, by a processor, training data from original data of a cloud service system, wherein the original data comprises running data of the cloud service system in a production environment including various operations, a monitoring log file or a database file, the extracted training data comprises data items including a data metric item and a label metric item, the data metric item comprises a resource request item and a resource utilization item, and the label metric item comprises a resource supply item;

processing the extracted training data to convert the data items included in the extracted training data into formatted training data having a data type usable for deep learning training;

performing the deep learning training based on the formatted training data to construct a resource configuration prediction model, wherein the resource configuration prediction model learns a relationship between the resource request item and the resource utilization item corresponding to the resource supply item;

in response to resource demand data input by a user, performing processing based on the resource demand data input by the user to obtain resource request data and resource utilization data, wherein the resource demand data comprises one or more of an account scale, a user scale, a virtual machine provisioning and management scale, concurrency, a type of a deployed service, and overall resource utilization of the cloud service system;

generating input data of the resource configuration prediction model based on the resource request data and the resource utilization data, wherein the input data of the resource configuration prediction model comprises a value of the resource request item and a value of the resource utilization item;

performing a prediction process to obtain resource configuration data of the cloud service system based on the input data of the resource configuration prediction model and the resource configuration prediction model, wherein the prediction process comprises:

substituting the value of the resource request item and the value of the resource utilization item into the resource configuration prediction model, to obtain a value of the resource supply item through calculation; and obtaining the resource configuration data of the cloud service system based on the value of the resource supply item; and outputting the resource configuration data.

2. The method according to claim 1, wherein the method further comprises:

storing the original data, the training data, and a model parameter of the resource configuration prediction model by using an object storage service.

3. The method according to claim 2, wherein before the performing of the prediction process based on the input data and the resource configuration prediction model, the method further comprises:

obtaining the model parameter of the resource configuration prediction model by using the object storage service; and obtaining the resource configuration prediction model by loading the model parameter.

4. A chip system, applied to a resource configuration prediction device, wherein the chip system comprises at least one processor and an interface circuit, the interface circuit and the at least one processor are interconnected by using a cable, and the at least one processor performs the resource allocation prediction method according to claim 1.

5. A server, comprising:

a processor, configured to execute instructions that cause the processor to:

extract training data from original data of a cloud service system, wherein the original data comprises running data of the cloud service system in a production environment including various operations, a monitoring log file or a database file, the extracted training data comprises data items including a data metric item and a label metric item, the data metric item comprises a resource request item and a resource utilization item, and the label metric item comprises a resource supply item;

process the extracted training data to convert the data items included in the extracted training data into formatted training data having a data type usable for deep learning training;

perform the deep learning training based on the formatted training data to construct a resource configuration prediction model, wherein the resource configuration prediction model learns a relationship between the resource request item and the resource utilization item corresponding to the resource supply item;

in response to resource demand data input by a user, performing processing based on the resource demand data input by the user to obtain resource request data and resource utilization data, wherein the resource demand data comprises one or more of an account scale, a user scale, a virtual machine provisioning and management scale, concurrency, a type of a deployed service, and overall resource utilization of the cloud service system;

generate input data of the resource configuration prediction model based on the resource request data and the resource utilization data, wherein the input data of the resource configuration prediction model comprises a value of the resource request item and a value of the resource utilization item;

perform a prediction process to obtain resource configuration data of the cloud service system based on the input data of the resource configuration prediction model and the resource configuration prediction model, wherein the prediction process comprises:

substituting the value of the resource request item and the value of the resource utilization item into the resource configuration prediction model, to obtain a value of the resource supply item through calculation; and obtaining the resource configuration data of the cloud service system based on the value of the resource supply item; and output the resource configuration data.

6. The server according to claim 5, wherein the processor is further caused to store the original data, the training data, and a model parameter of the resource configuration prediction model by using an object storage service.

7. The server according to claim 6, wherein before the performing of the prediction process based on the input data and the resource configuration prediction model, the processor is further caused to:

obtain the model parameter of the resource configuration prediction model by using the object storage service; and obtain the resource configuration prediction model by loading the model parameter.

8. A non-transitory computer readable storage medium having instructions stored thereon that, when executed by a processor, cause an apparatus to:

extract training data from original data of a cloud service system, wherein the original data comprises running data of the cloud service system in a production environment including various operations, a monitoring log file or a database file, the extracted training data comprises data items including a data metric item and a label metric item, the data metric item comprises a resource request item and a resource utilization item, and the label metric item comprises a resource supply item;

process the extracted training data to convert the data items included in the extracted training data into formatted training data having a data type usable for deep learning training;

perform the deep learning training based on the formatted training data to construct a resource configuration prediction model, wherein the resource configuration prediction model learns a relationship between the resource request item and the resource utilization item corresponding to the resource supply item;

in response to resource demand data input by a user, performing processing based on the resource demand data input by the user to obtain resource request data and resource utilization data, wherein the resource demand data comprises one or more of an account scale, a user scale, a virtual machine provisioning and management scale, concurrency, a type of a deployed service, and overall resource utilization of the cloud service system;

generate input data of the resource configuration prediction model based on the resource request data and the resource utilization data, wherein the input data of the resource configuration prediction model comprises a value of the resource request item and a value of the resource utilization item;

perform a prediction process to obtain resource configuration data of the cloud service system based on the input data of the resource configuration prediction model and the resource configuration prediction model, wherein the prediction process comprises:

substituting the value of the resource request item and the value of the resource utilization item into the resource configuration prediction model, to obtain a value of the resource supply item through calculation; and obtaining the resource configuration data of the cloud service system based on the value of the resource supply item; and output the resource configuration data.

9. The non-transitory computer readable storage medium according to claim 8, wherein the apparatus is further caused to:

store the original data, the training data, and a model parameter of the resource configuration prediction model by using an object storage service in a memory.

10. The non-transitory computer readable storage medium according to claim 9, wherein before the apparatus is caused to perform the prediction process based on the input data and the resource configuration prediction model, the apparatus is further caused to:

obtain the model parameter of the resource configuration prediction model by using the object storage service; and obtain the resource configuration prediction model by loading the model parameter.

\* \* \* \* \*